(12) United States Patent
Lauder

(10) Patent No.: US 10,577,090 B2
(45) Date of Patent: Mar. 3, 2020

(54) ELECTRIC PROPULSION SYSTEM WITH OVERRUNNING CLUTCH FOR A ROTARY-WING AIRCRAFT

(71) Applicant: SIKORSKY AIRCRAFT CORPORATION, Stratford, CT (US)

(72) Inventor: Timothy Fred Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 561 days.

(21) Appl. No.: 15/434,951

(22) Filed: Feb. 16, 2017

(65) Prior Publication Data

US 2018/0229835 A1    Aug. 16, 2018

(51) Int. Cl.
| | |
|---|---|
| *B64D 35/00* | (2006.01) |
| *B64C 27/14* | (2006.01) |
| *B64D 35/02* | (2006.01) |
| *B64D 27/24* | (2006.01) |
| *F16D 41/00* | (2006.01) |
| *F16D 41/066* | (2006.01) |

(52) U.S. Cl.
CPC .............. *B64C 27/14* (2013.01); *B64D 27/24* (2013.01); *B64D 35/02* (2013.01); *F16D 41/00* (2013.01); *F16D 2041/0665* (2013.01); *Y02T 50/62* (2013.01)

(58) Field of Classification Search
CPC .......... B64C 27/12; B64C 27/24; B64D 35/02
See application file for complete search history.

(56) References Cited

U.S. PATENT DOCUMENTS

| 853,107 | A | | 5/1907 | Mershon |
|---|---|---|---|---|
| 1,936,542 | A | | 11/1933 | Nardone |
| 3,362,255 | A | | 1/1968 | De Rocca et al. |
| 4,558,770 | A | * | 12/1985 | Woodruff ............... F16D 41/00 192/48.6 |
| 4,690,390 | A | * | 9/1987 | Kish ..................... F16D 41/206 192/41 S |

(Continued)

FOREIGN PATENT DOCUMENTS

| CN | 1857965 A | 11/2006 |
|---|---|---|
| CN | 101244762 A | 8/2008 |

(Continued)

*Primary Examiner* — Richard G Davis
(74) *Attorney, Agent, or Firm* — Cantor Colburn LLP

(57) ABSTRACT

An electric propulsion system for use with a mast defining an axis of rotation and one or more rotor blades which rotate about the axis of rotation, includes a yoke assembly, electric motor, motor support housing, and overrunning clutch. The yoke assembly is rotatable with respect to the mast, and configured to support one or more of the rotor blades. The motor includes a motor-stator and a motor-rotor, and is arranged circumferentially around the mast. The housing circumferentially surrounds the mast and includes a rotatable portion attached to and rotatable with the yoke assembly. The overrunning clutch includes an inner hub rotatable with the motor-rotor, and an outer hub rotatable with the rotatable portion of the housing. The overrunning clutch is configured to transfer torque from the motor to the yoke assembly in a drive mode, and configured to disengage the yoke assembly from the motor in an overrunning mode.

20 Claims, 7 Drawing Sheets

(56) References Cited

U.S. PATENT DOCUMENTS

| | | |
|---|---|---|
| 4,899,957 A | 2/1990 | Eickmann |
| 5,188,511 A | 2/1993 | Ebert |
| 5,271,295 A | 12/1993 | Marnot |
| 5,749,449 A | 5/1998 | Kearney et al. |
| 6,484,967 B2 | 11/2002 | Protte |
| 6,823,972 B2 | 11/2004 | Gmirya |
| 7,621,480 B2 | 11/2009 | Darrow, Jr. et al. |
| 8,181,902 B2 | 5/2012 | Schlunke |
| 8,235,324 B1 | 8/2012 | Birch et al. |
| 8,531,072 B2 | 9/2013 | Wishart |
| 8,628,042 B2 | 1/2014 | Imbert et al. |
| 8,844,880 B1 | 9/2014 | Corliss |
| 8,851,415 B1 | 10/2014 | Lugg |
| 8,931,732 B2 | 1/2015 | Sirohi et al. |
| 8,948,928 B2 * | 2/2015 | Alber .................. B64C 39/022 244/17.11 |
| 9,004,395 B2 | 4/2015 | Botti |
| 9,272,779 B2 | 3/2016 | Groenewald et al. |
| 9,446,842 B2 | 9/2016 | Luyks |
| 9,584,000 B2 | 2/2017 | Ruan et al. |
| 9,725,179 B2 | 8/2017 | Aubert et al. |
| 9,828,089 B2 * | 11/2017 | Lauder .................. B64C 27/14 |
| 2009/0140095 A1 * | 6/2009 | Sirohi .................. B64C 27/22 244/17.19 |
| 2010/0209242 A1 | 8/2010 | Popelka et al. |
| 2011/0015034 A1 * | 1/2011 | Ehinger .................. B64C 27/08 477/70 |
| 2013/0126669 A1 * | 5/2013 | Hamann .................. B64C 27/12 244/60 |
| 2013/0170985 A1 | 7/2013 | Altmikus et al. |
| 2015/0093272 A1 | 4/2015 | Komer et al. |
| 2017/0040870 A1 | 2/2017 | Ballauf |
| 2017/0167317 A1 | 6/2017 | Lee et al. |
| 2017/0217576 A1 | 8/2017 | Lauder et al. |
| 2017/0253328 A1 | 9/2017 | Wang |
| 2017/0297689 A1 | 10/2017 | Lauder et al. |
| 2018/0105263 A1 | 4/2018 | Lauder |
| 2019/0023383 A1 | 1/2019 | Lauder |
| 2019/0023384 A1 | 1/2019 | Lauder |

FOREIGN PATENT DOCUMENTS

| | | |
|---|---|---|
| GB | 2360752 A | 10/2001 |
| JP | 4742390 B2 | 8/2011 |
| JP | 2014149075 A | 8/2014 |
| WO | 2005100154 A1 | 10/2005 |
| WO | 2016128330 A1 | 8/2016 |

* cited by examiner

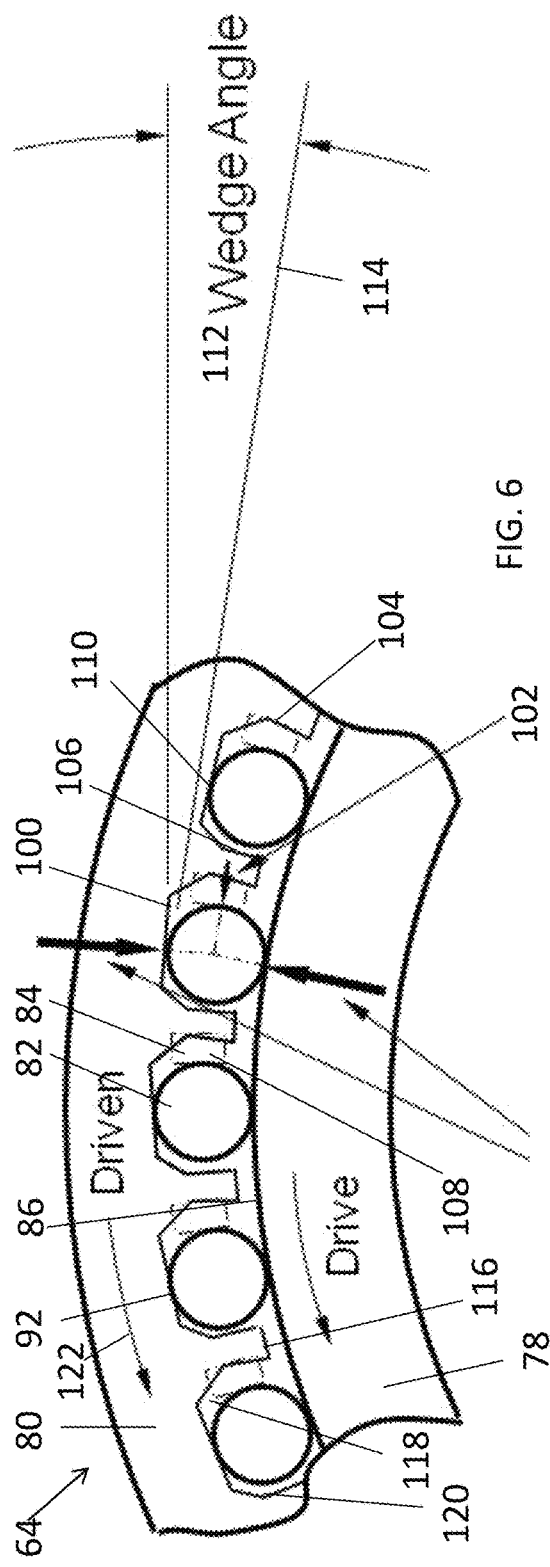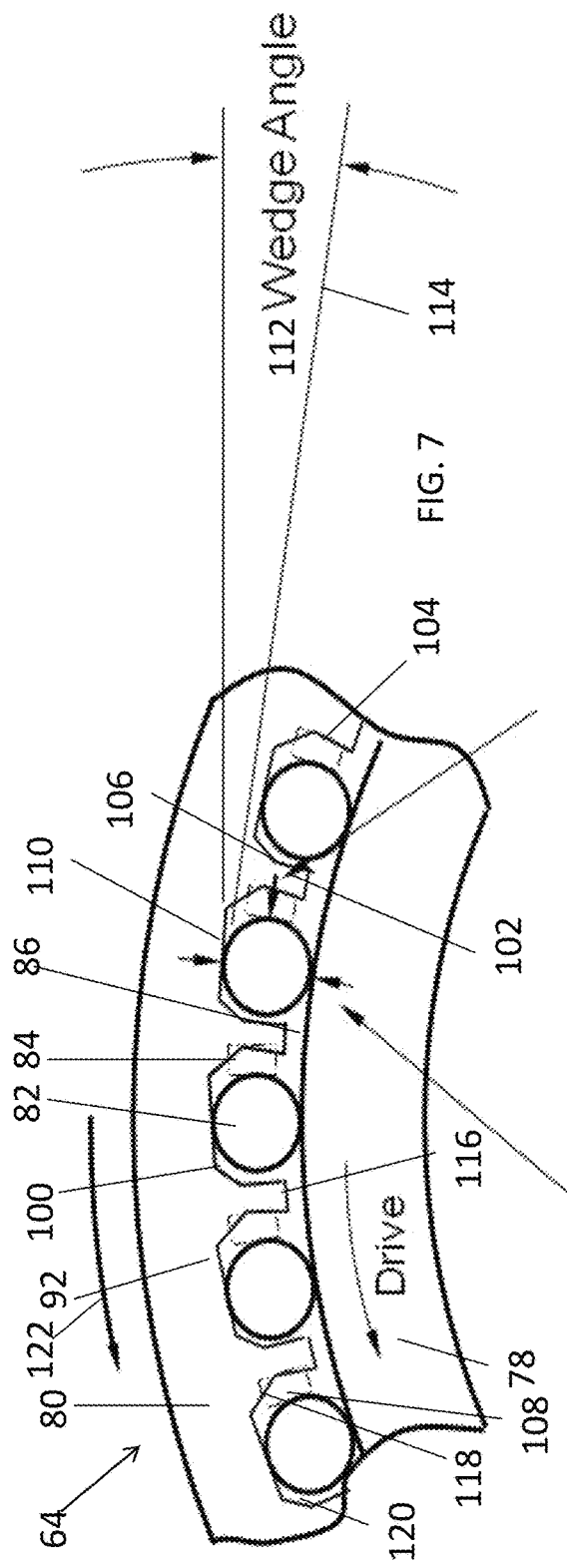

ELECTRIC PROPULSION SYSTEM WITH OVERRUNNING CLUTCH FOR A ROTARY-WING AIRCRAFT

BACKGROUND

The present disclosure relates to a rotary-wing aircraft, and more particularly, to a rotary-wing aircraft having an electric propulsion system with an overrunning clutch.

Conventional rotary-wing aircraft typically utilize a mechanical drive train to transmit power from one or more engines to drive main and tail rotor systems. The helicopter mechanical drive train may include a main rotor gearbox, an intermediate gearbox, a tail rotor gearbox and their interconnecting shafts. The main rotor gearbox converts the high speed input from each engine to a low speed output for the main rotor system. The main rotor gearbox may also provide power take-offs to drive an anti-torque system, a hydraulic system and other such systems.

The mechanical drive train may further include an overrunning clutch. The overrunning clutch in a traditional helicopter allows the rotor speed to exceed the motor or drive speed. The overrunning clutch thus prevents rotor over speed from back driving the engine, and, in an engine out situation, the overrunning clutch eliminates the engine drag (torque opposing rotation) from retarding the ability of the rotor to freely spin, or autorotate. The overrunning clutch is typically mounted to the input stage of the gearbox where the rotation speed is high and the torque is low, and typically yields the lowest weight clutch mechanism possible. Traditionally, a sprag clutch is utilized as its high speed and limited torque capability make it ideal for that application. However, while in the overrunning mode, the cam elements (torque transfer members) in this clutch design continue to stay in contact with both the clutches inner and outer hub, requiring continuous oil lubrication to minimize heat and wear on the components.

While such arrangements have generally satisfied the requirements for traditional rotor systems, the art would be receptive to improved methods and systems for clutch arrangements in rotary-wing aircraft.

BRIEF DESCRIPTION

According to an embodiment, an electric propulsion system for use with a mast defining an axis of rotation and one or more rotor blades which rotate about the axis of rotation, includes a yoke assembly, an electric motor, a motor support housing, and an overrunning clutch. The yoke assembly is rotatable with respect to the mast and about the axis of rotation, and the yoke assembly is configured to support one or more of the rotor blades therefrom. The electric motor includes a motor-stator and a motor-rotor, and the electric motor is arranged circumferentially around the mast. The motor support housing circumferentially surrounds the mast and includes a rotatable portion attached to the yoke assembly and rotatable with the yoke assembly. The overrunning clutch includes an inner hub and an outer hub, the inner hub rotatable with the motor-rotor, and the outer hub rotatable with the rotatable portion of the motor support housing. The overrunning clutch is configured to transfer torque from the electric motor to the yoke assembly in a drive mode of the electric propulsion system, and the overrunning clutch is configured to disengage the yoke assembly from the electric motor in an overrunning mode of the electric propulsion system.

In addition to one or more of the features described above, or as an alternative, in further embodiments an outer hub rotational speed of the outer hub is the same as an inner hub rotational speed of the inner hub during the drive mode, and the outer hub is rotationally free from the inner hub such that the outer hub rotational speed is different from the inner hub rotational speed during the overrunning mode.

In addition to one or more of the features described above, or as an alternative, in further embodiments a plurality of roller elements are trapped between the outer hub and the inner hub, the roller elements in contact with the inner hub in the drive mode.

In addition to one or more of the features described above, or as an alternative, in further embodiments, the overrunning mode includes a first overrunning mode that temporarily disengages the yoke assembly from the electric motor, and a second overrunning mode that disengages the yoke assembly from the electric motor for a longer time period than the first overrunning mode.

In addition to one or more of the features described above, or as an alternative, in further embodiments, the plurality of roller elements maintain contact with the inner and outer hubs in the first overrunning mode, and torque is not transferred from the inner hub to the outer hub in the first overrunning mode.

In addition to one or more of the features described above, or as an alternative, in further embodiments, the first overrunning mode lasts for a time period of approximately two seconds or less.

In addition to one or more of the features described above, or as an alternative, in further embodiments, the plurality of roller elements are not in contact with the inner hub in the second overrunning mode.

In addition to one or more of the features described above, or as an alternative, in further embodiments, the one or more rotor blades auto-rotate about the axis of rotation in the second overrunning mode.

In addition to one or more of the features described above, or as an alternative, in further embodiments, the outer hub includes a plurality of wedge pockets respectively supporting the plurality of roller elements therein, each wedge pocket including a wall that forms an acute wedge angle with a line tangent to the inner hub between first and second sides of each wedge pocket.

In addition to one or more of the features described above, or as an alternative, in further embodiments, in the overrunning mode, centrifugal force pushes the roller elements towards the first sides of the wedge pockets, and in the drive mode, rotation of the inner hub in a drive direction and a resilient member in each wedge pocket pushes the roller elements to the second sides of the wedge pockets.

In addition to one or more of the features described above, or as an alternative, in further embodiments, the outer hub is integrally combined with and rotatable with the rotatable portion of the motor support housing.

In addition to one or more of the features described above, or as an alternative, in further embodiments, a plurality of roller elements are trapped between the inner and outer hubs, wherein the inner hub includes an inner hub race, and the outer hub includes a plurality of wedge pockets respectively supporting the plurality of roller elements therein.

In addition to one or more of the features described above, or as an alternative, in further embodiments, each wedge pocket includes a first side and a second side, each roller element biased towards the second side by a resilient member.

In addition to one or more of the features described above, or as an alternative, in further embodiments, each wedge pocket includes both a first radial depth at the first side and a second radial depth at the second side, the second radial depth less than the first radial depth, the roller element in each wedge pocket disposed at the second side during the drive mode and moved towards the first side during the overrunning mode.

In addition to one or more of the features described above, or as an alternative, in further embodiments, an inner hub support member is arranged to support the motor-rotor thereon, the inner hub support member is connected to the inner hub, and one or more inner hub guides are disposed between the inner hub support member and the yoke assembly.

According to an embodiment, a rotary-wing aircraft includes an airframe, a mast, a plurality of rotor blades, a yoke assembly, an electric motor, a motor support housing, and an overrunning clutch. The mast is engaged to the airframe and defines an axis of rotation, and the mast is stationary with respect to the airframe. The yoke assembly is rotatable with respect to the mast and about the axis of rotation, and the yoke assembly is configured to support one or more rotor blades projecting radially outward from the yoke assembly. The electric motor includes a motor-stator and a motor-rotor, the electric motor is arranged circumferentially around the mast, and the electric motor is disposed exteriorly of the airframe. The motor support housing circumferentially surrounds the mast and includes a rotatable portion rotatable with the yoke assembly. The overrunning clutch includes an inner hub and an outer hub. The inner hub is rotatable with the motor-rotor, and the outer hub is rotatable with the rotatable portion of the motor support housing. The overrunning clutch is configured to transfer torque from the electric motor to the yoke assembly in a drive mode of the electric propulsion system, and the overrunning clutch is configured to disengage the yoke assembly from the electric motor in an overrunning mode of the electric propulsion system when rotational speed of the yoke assembly exceeds rotational speed of the motor-rotor.

In addition to one or more of the features described above, or as an alternative, in further embodiments, the rotor blades form one of a main rotor system and a tail rotor system of the rotary-wing aircraft.

In addition to one or more of the features described above, or as an alternative, in further embodiments, the overrunning clutch is disposed radially between the electric motor and the mast.

In addition to one or more of the features described above, or as an alternative, in further embodiments, the electric motor is a first motor, the overrunning clutch is a first overrunning clutch, the electric propulsion system further includes a second motor and a second overrunning clutch, and the first motor and the first overrunning clutch are longitudinally separated from the second motor and the second overrunning clutch with respect to the mast by the yoke assembly.

In addition to one or more of the features described above, or as an alternative, in further embodiments, the second motor is arranged closer to the airframe than the first motor.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 6 is a schematic partial sectional view of an embodiment of an overrunning clutch for the propulsion system in a drive mode;

FIG. 7 is a schematic partial sectional view of the overrunning clutch of FIG. 6 in a momentary overrunning mode of the propulsion system; and, FIG. 8 is a schematic partial sectional view of the overrunning clutch of FIG. 6 in an overrunning mode of the propulsion system.

DETAILED DESCRIPTION

Figure 1:
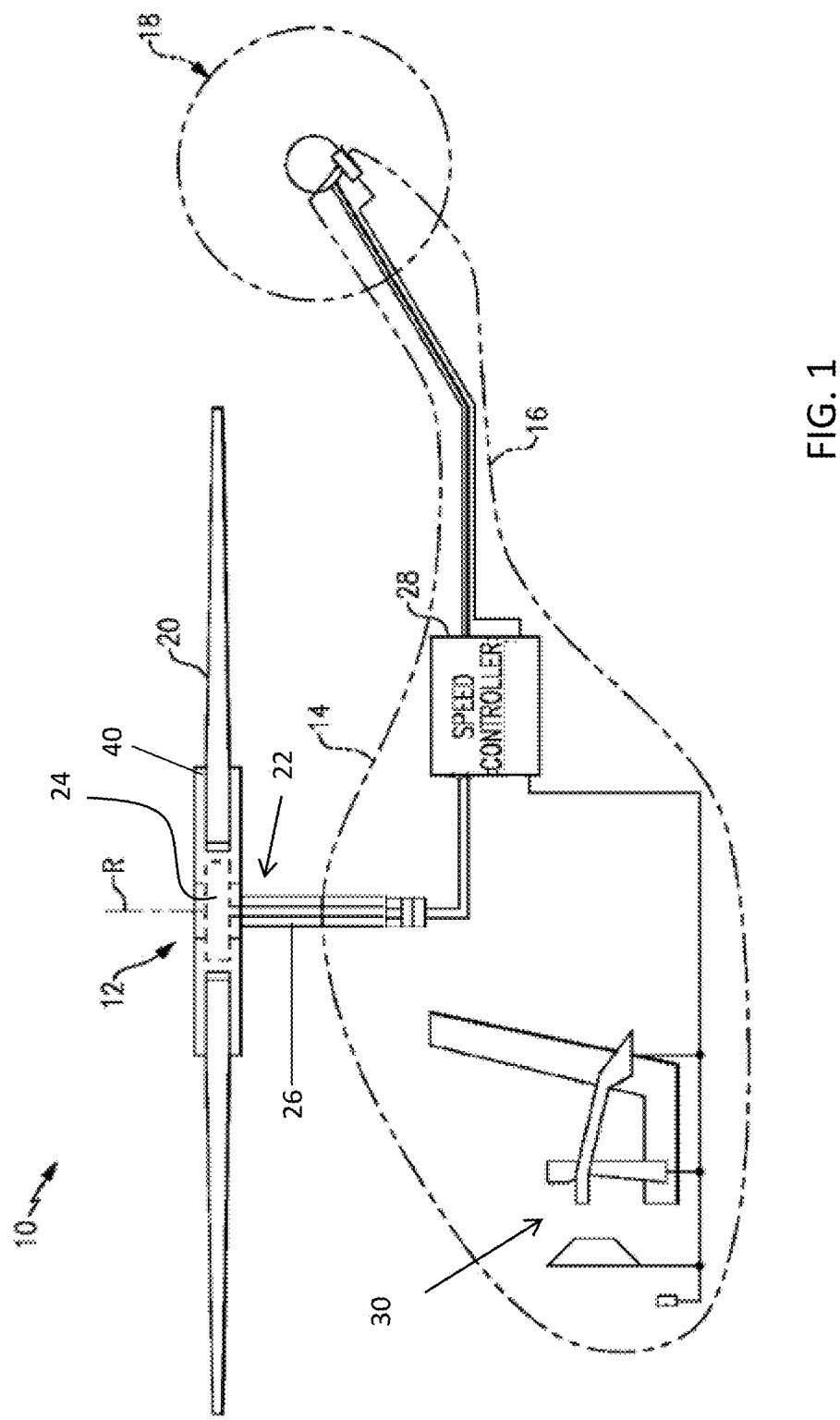
FIG. 1 is a schematic diagram of an example of a rotary-wing aircraft.
Figure 2:
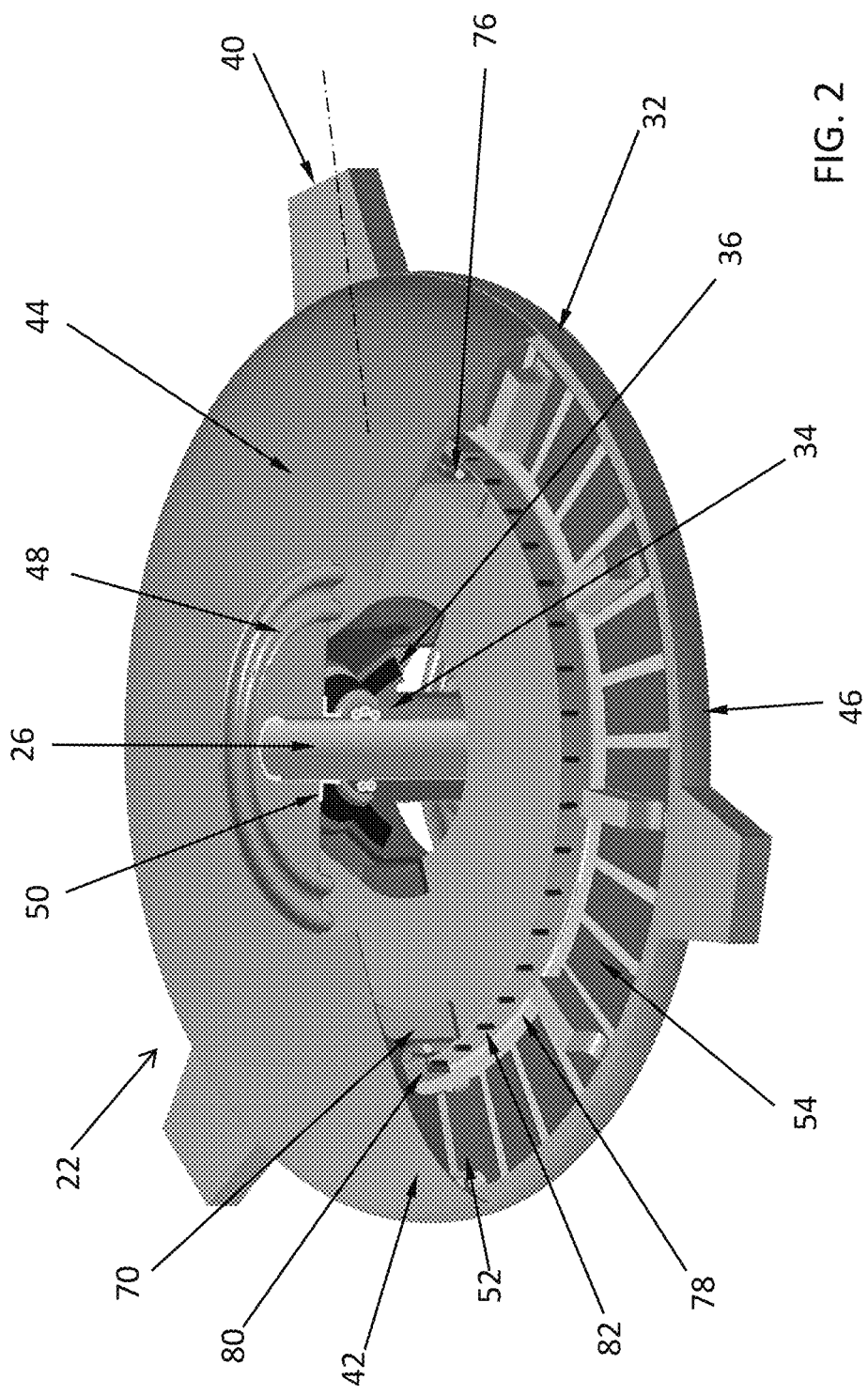
FIG. 2 is a perspective, partially cut away view of a propulsion system of a rotary-wing aircraft according to an embodiment.

FIG. 1 schematically illustrates an example of a vertical takeoff and landing (VTOL) rotary-wing aircraft 10. The aircraft 10 in the non-limiting embodiment of FIG. 1 includes a main rotor system 12 supported by an airframe 14 having an extending tail 16 which mounts an anti-torque system, such as a tail rotor system 18. The main rotor system 12 includes a plurality of rotor blades 20 configured to rotate about an axis of rotation R. The tail rotor system 18 may also include a plurality of rotor blades configured to rotate about an axis of rotation. Although a particular helicopter configuration is schematically illustrated in the disclosed non-limiting embodiments, other configurations and/or machines, such as Unmanned Air Vehicles, high speed compound rotary-wing aircraft with supplemental translational thrust systems, dual counter-rotating, coaxial rotor system aircraft, tilt-rotors and tilt-wing aircraft in either manned or unmanned configurations will also benefit from embodiments disclosed herein.

At least one of the main rotor system 12 and the tail rotor system 18 is configured as an electric propulsion system 22 that generally integrates a direct drive electric motor 24 into the rotary-wing aircraft 10. In such embodiments, the propulsion system 22 includes a static mast 26 that is generally stationary relative to the airframe 14 of the aircraft 10. The electric motor 24 of the propulsion system 22 may be controlled by an electronic speed controller 28 over a wide range of speeds in response to a flight control system 30.

An example of the propulsion system 22 for the main rotor system 12 of the rotary-wing aircraft 10 is illustrated in more detail in FIGS. 2 to 5, however it should be understood that the propulsion system 22 may also be utilized for the tail rotor system 18. The static mast 26 extends along a longitudinal axis and the static mast 26 defines, but does not rotate about, an axis of rotation R. The longitudinal axis and axis of rotation R may, as in the illustrated embodiment, coincide. As previously described, a plurality of outwardly extending rotor blades 20 are operably coupled to the propulsion system 22. It should be understood that a rotor system 12 having any number of rotor blades 20 is contemplated herein.

A yoke assembly 32 is configured to operably couple an inboard end of each rotor blade 20 to the motor 24 and assist in positioning the rotor blades 20 relative to the static mast 26. In the illustrated embodiment, a bearing system 34 is positioned between the yoke assembly 32 and the static mast 26. In an embodiment, the bearing system 34 includes an elastomeric gimbal 36 mounted concentrically with the static mast 26. The gimbal 36 is configured to allow the yoke assembly 32, and therefore rotor blades 20, to pivot or articulate relative to the static mast 26. The gimbal 36 provides additional degrees of freedom of movement such that the pivot axis of the yoke assembly 32 and rotor blade 20 is no longer constrained to a configuration normal to the rotational axis R, or to an axis traversing the rotational axis R. Further, the bearing system 34 may include one or more roller bearings 38 that allow the gimbal 36, and the yoke assembly 32 coupled thereto, to rotate freely about the static mast 26. Gimbal 36 reduces the maintenance and operating costs associated with the bearing system 34 by eliminating sliding contact associated with mechanical bearings. Further, the gimbal 36 can be designed to reduce rotor hub moments, which in turn reduces weight. Weight reduction is particularly desirable for VTOL aircraft.

In one embodiment, the yoke assembly 32 may be integrally formed as a rigid disc mounted concentrically with the static mast 26, such that the yoke assembly 32 is disc-shaped. Alternatively, a plurality of yokes in the yoke assembly 32, associated with one or more of the plurality of rotor blades 20, may be separate components spaced about the periphery of the static mast 26. In one embodiment, a blade cuff 40 may be configured to couple to a corresponding rotor blade 20. In an embodiment where the yoke assembly 32 is disc-shaped, such blade cuffs 40 may be integrally formed with and extend generally outwardly from the outer periphery of the disc. While certain embodiments of the yoke assembly 32 have been described, the yoke assembly 32 and its connection to the blades 20 may take on various configurations to meet the requirements of different rotary-wing aircraft 10. Also, while shown with a blade cuff 40, other mechanisms can be used to connect the blades 20 to the assembly 32.

In one embodiment of the propulsion system 22, a fairing 42 generally surrounds the yoke assembly 32 and the bearing system 34 to provide structural support to the propulsion system 22 and to enhance the aerodynamic properties of the propulsion system 22, such as by reducing the drag thereof. The fairing 42 may include a plurality of complementary portions, such as an upper fairing 44 and lower fairing 46. In an embodiment, the upper and lower fairings 44, 46 are substantially identical and symmetrical about the plane through the vertex of the gimbal bearing system 34 and normal to the axis of rotation R. Adjacent ends of the upper and lower fairings 44, 46 are separated from one another to define a gap within which the yoke assembly 32 and rotor blades 20 rotate relative to the static mast 26. In the illustrated, non-limiting embodiment, each of the upper and lower fairings 44, 46 includes a diaphragm 48 configured to couple the fairings 44, 46 to the static mast 26 via an attachment mechanism 50. Inclusion of the diaphragm 48 is intended to allow articulation of the fairing 42 and the yoke assembly 32 relative to the static mast 26.

The electric motor 24, configured to drive rotation of the plurality of rotor blades 20 about the axis R, includes a motor-stator 52 at least substantially rigidly coupled to the static mast 26, and a motor-rotor 54 configured to rotate about the axis R. The motor-stator 52 includes at least one electromagnetic coil 56 affixed to an interior surface 58 of the fairing 42. Wiring associated with the at least one electromagnetic coil 56 may extend through a hollow interior of the static mast 26. In an embodiment, electromagnetic coils 56 may be affixed to both the upper fairing 44 and the lower fairing 46 to form a dual motor arrangement including a first motor 24 and a second motor 24 longitudinally separated from each other by the yoke assembly 32. In a dual motor arrangement, the second motor 24 may be positioned closer to the airframe 14 than the first motor 24 due to the location of the first and second motors 24 along the longitudinal axis of the mast 26 which extends from the airframe 14. The total number of electromagnetic coils 56 included in the motor 24 may vary based on the desired performance of the propulsion system 22. The electromagnetic coils 56 are spaced circumferentially about the static mast 26 and are generally located at a position spaced radially outward from the static mast 26, such as adjacent to (but radially within) the outer periphery of the fairings 44, 46. In embodiments of the propulsion system 22 having a dual motor arrangement, one or more of the electromagnetic coils 56 mounted to the upper fairing 44 may be vertically aligned with one or more electromagnetic coils 56 mounted to the lower fairing 46. Alternatively, or in addition, the one or more of the electromagnetic coils 56 mounted to the upper fairing 44 may be staggered relative to the electromagnetic coils 56 mounted to the lower fairing 46.

Figure 4:
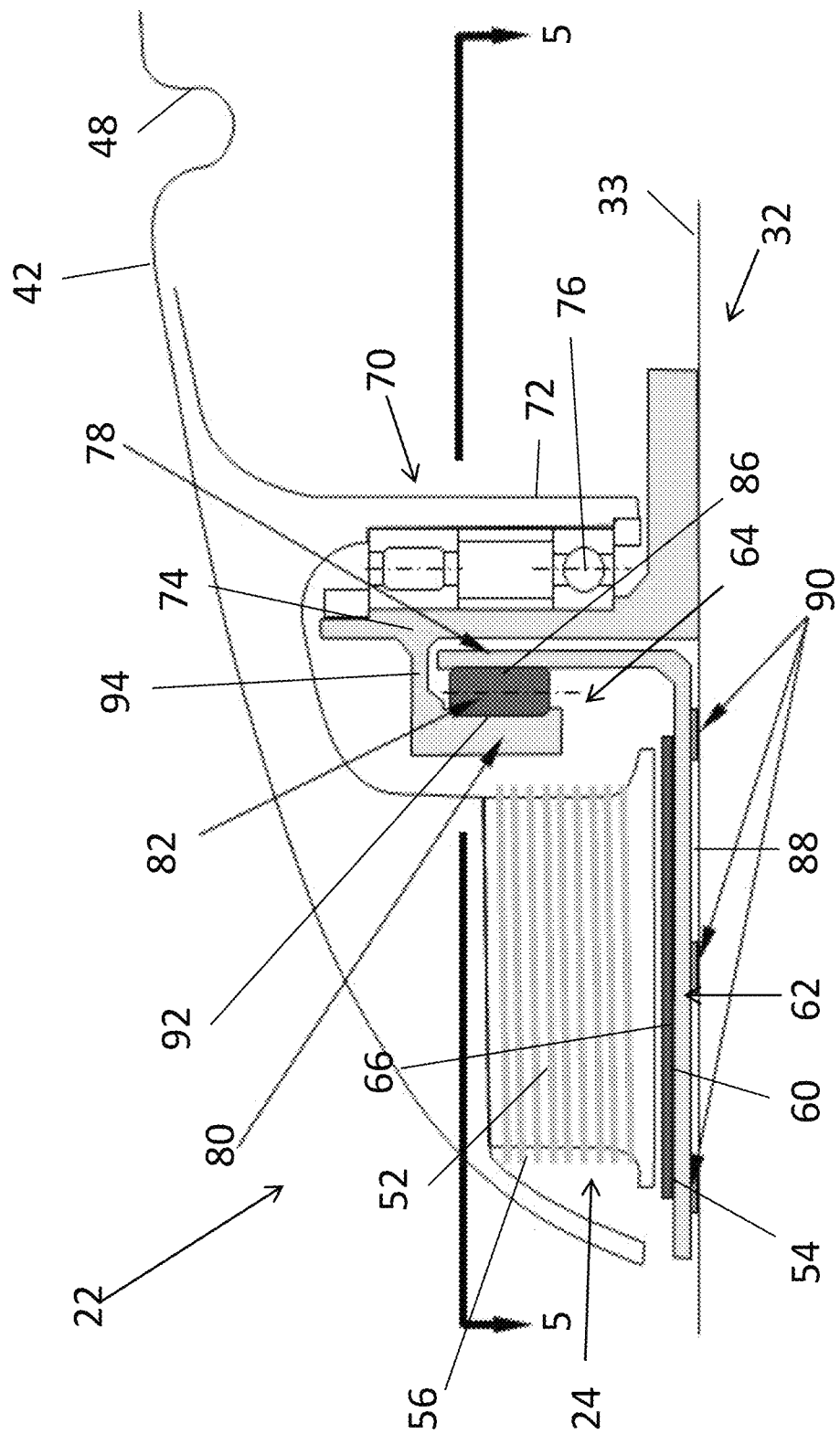
FIG. 4 is a schematic sectional view of a portion of the propulsion system of FIG. 2 according to an embodiment.

The motor-rotor 54 of the motor 24 includes one or more permanent magnets 60 mounted to an inner hub support member 62, shown in FIG. 4. The inner hub support member 62 is connected to an overrunning clutch 64, as will be further described below. The magnets 60 may be mounted to the inner hub support member 62 horizontally and may be positioned such that the one or more magnets 60 are vertically alignable with the at least one electromagnetic coil 56. In an embodiment, the magnets 60 are fixedly or removably mounted to a surface 66 of the inner hub support member 62 that faces the interior surface 58 of the fairing 42, and faces the electromagnetic coil 56. In another embodiment, the magnets 60 are partially or fully embedded within the inner hub support member 62, such as within one or more complementary openings (not shown) formed therein. The magnets 60 may be generally circumferentially positioned about the inner hub support member 62, in a pattern concentric with the static mast 26. The magnets 60 may, but need not be, equidistantly spaced about the inner hub support member 62. The motor-rotor 54, and thus the inner hub support member 62, is configured to rotate with respect to the motor-stator 52 and configured to rotate with respect to the static mast 26 as the magnets 60 of the motor-rotor 54 react with an induced magnetic field generated when the electromagnetic coils 56 of the motor-stator 52 are energized.

The spatial positioning between the electromagnetic coils 56 of the motor-stator 52 and the adjacent permanent magnets 60 of the motor-rotor 54 is defined, at least in part, by a motor support housing 70, shown in detail in FIG. 4. In the illustrated non-limiting embodiment, the motor support housing 70 includes a stationary portion 72 coupled to a fairing 42, where the fairing 42 also has one or more electromagnetic coils 56 mounted thereto, and a rotatable portion 74 coupled to an adjacent surface 33 of the yoke assembly 32. The surface 33 of the yoke assembly 32 faces the fairing 42, such as upper fairing 44, and electromagnetic coils 56 of its respective motor 24, such as first motor 24. The yoke assembly 32 includes an opposite surface, and in a dual motor arrangement the opposite surface of the yoke assembly 32 faces the lower fairing 46 and the electromagnetic coils 56 of the second motor 24. At least one bearing 76 is arranged at the interface between the stationary and rotatable portions 72, 74 of the motor support housing 70. A liner of the rotatable portion 74 of the motor support housing 70 is configured to engage the at least one bearing 76 and may be formed from any suitable material, such as a metal or composite material for example.

Figure 3:
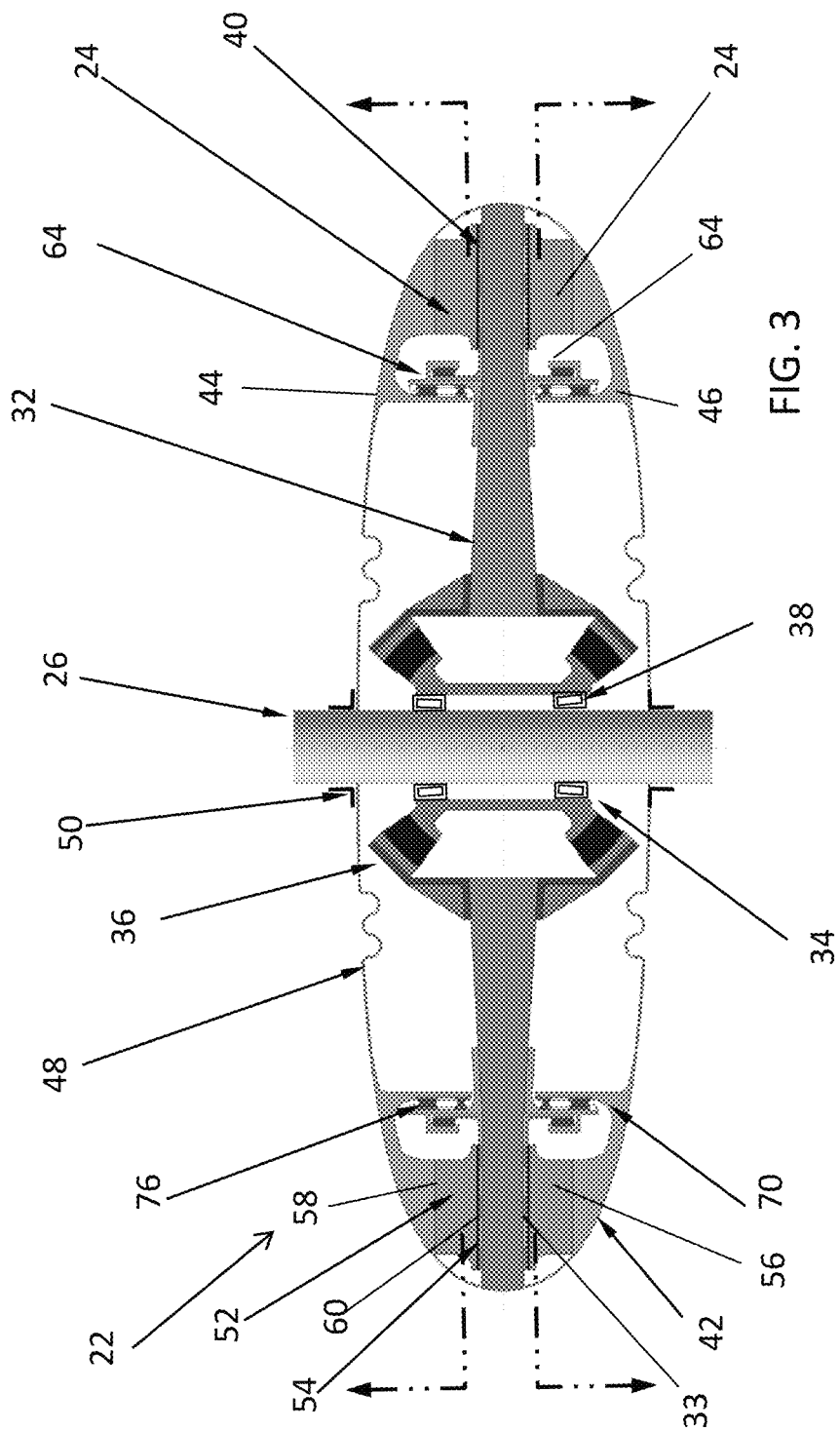
FIG. 3 is a schematic sectional view of the propulsion system of FIG. 2 according to an embodiment.

The propulsion system 22 further includes the overrunning clutch 64 operable in both a drive mode (engaged condition), where torque is transferred between the motor 24 and the main rotor system 12 (or the tail rotor system 18), and an overrunning mode (disengaged condition) where torque is not transferred between the motor 24 and system 12 (or system 18). These modes will be additionally described with respect to FIGS. 6-8. In an embodiment where the propulsion system 22 includes first and second motors 24, then the propulsion system 22 will correspondingly include first and second overrunning clutches 64, as indicated in FIG. 3. The first and second overrunning clutches 64 may, in one embodiment, be substantially identical, however it should be understood that the clutches 64 may alternatively include different sizes and features so as to be accommodated within different rotary-wing aircraft. Further, the overrunning clutch 64 may be a single overrunning clutch 64, such as when the propulsion system 22 includes a single motor 24.

The overrunning clutch 64 includes an inner hub 78, an outer hub 80, roller elements 82, and resilient members 84, as will be further described below, with respect to FIG. 4. The inner hub 78 is connected to and rotatable with the motor-rotor 54. In one embodiment, the inner hub 78 is tubular-shaped and concentric with the mast 26. The inner hub 78 includes a relatively smooth cylindrical outer surface 86 that faces radially outwardly with respect to rotation axis R. The surface 86 serves as a roller element race for the roller elements 82. The inner hub support member 62 connects the inner hub 78 to the motor-rotor 54, and further serves, at least in part, to maintain positioning of the inner hub 78 relative to the outer hub 80. In the illustrated embodiment, the inner hub support member 62 includes the first surface 66 configured to support the magnets 60 thereon, and an opposite second surface 88 facing the surface 33 of the yoke assembly 32. The inner hub support member 62 may be ring-shaped, although other shapes may be embodied such as, but not limited to, magnet-supporting spokes that extend from the inner hub 78. In the illustrated embodiment, a cross-section of the inner hub support member 62 extends substantially perpendicularly with respect to a cross-section of the inner hub 78. Further, as demonstrated by the illustrated, non-limiting embodiment, the inner hub 78 and the inner hub support member 62 may be integrally connected. The inner hub support member 62 maintains positioning of the inner hub 78 relative to the outer hub 80 in part through the use of inner hub guides 90 disposed between the second surface 88 of the inner hub support member 62 and the yoke assembly 32. The inner hub guides 90 may take on various forms such as, but not limited to, protrusions and ball bearings to enable independent rotational travel of the yoke assembly 32 with respect to the motor-rotor 54 in an overrunning mode. The inner hub guides 90 radially fix the positioning of the inner hub 78 with respect to the outer hub 80. Further, while three radially distinct inner hub guides 90 are illustrated, the number and radial locations of the inner hub guides 90 for each overrunning clutch 64 is dependent on the size of the motor 24 and may be varied as required.

The outer hub 80 is a driven member (or "overrunning" member) of the overrunning clutch 64. The outer hub 80 is designed to retain the roller elements 82 during operation, enable the roller elements 82 to pinch the inner hub 78 and outer hub 80, thus transferring torque, and also allow the roller elements 82 to slide outward, away from the inner hub 78, eliminating contact when the rotor blades 20 (and yoke assembly 32) over-speeds the motor 24. In one embodiment, the outer hub 80 is supported by the rotatable portion 74 of the motor support housing 70, thus providing dual-purpose to the motor support housing 70. Furthermore, the outer hub 80 may be integrated into the rotatable portion 74 of the motor support housing 70. The rotatable portion 74, and thus the outer hub 80, is mechanically fastened to the yoke assembly 32, such as to the surface 33 of the yoke assembly 32. In one embodiment, the outer hub 80 is tubular-shaped and concentrically surrounds the inner hub 78, the rotatable portion 74, the stationary portion 72, and the static mast 26. The outer hub 80 includes a pocketed surface 92 that faces radially inward with respect to rotation axis R. A width of a radial gap that exists between the outer surface 86 of the inner hub 78 and the pocketed surface 92 of the outer hub 80 varies based on the circumferential location of the pocketed surface 92. An outer hub connecting member 94 connects the outer hub 80 to the rotatable portion 74, and further serves, in part, to maintain positioning of the outer hub 80 relative to the inner hub 78. In the illustrated embodiment, the outer hub connecting member 94 includes a first surface facing the fairing 42, and a second surface facing the roller elements 82 as well as the surface 33 of the yoke assembly 32. The outer hub connecting member 94 may be ring-shaped, although other shapes may be embodied such as, but not limited to, spokes that extend from the rotatable portion 74 to the outer hub 80. In the illustrated embodiment as shown in FIG. 4, a cross-section of the outer hub 80, outer hub connecting member 94, and the rotatable portion 74 may be substantially U-shaped. Further, as demonstrated by the illustrated, non-limiting embodiment, the outer hub 80, outer hub connecting member 94, and rotatable portion 74 may be integrally connected. In the illustrated embodiment, the inner hub 78 is disposed radially between the outer hub 80 and the rotatable portion 74, with the outer hub 80 disposed radially outward of the inner hub 78 and the rotatable portion 74 disposed radially inward of the inner hub 78.

Figure 5:
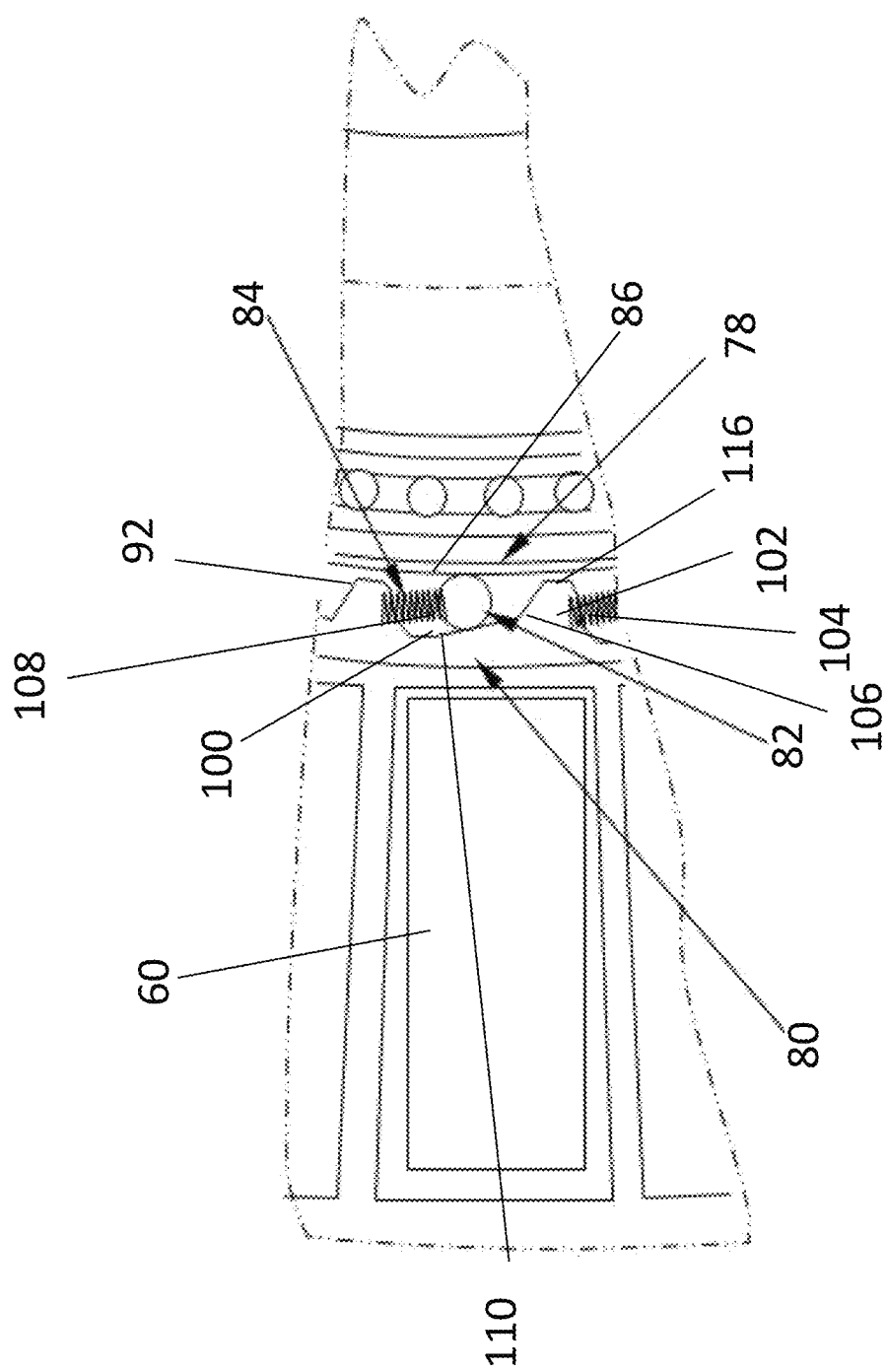
FIG. 5 is a schematic partial sectional view taken along line 5-5 of FIG. 4 according to an embodiment.

With reference to FIG. 5, a portion of the pocketed surface 92 of the outer hub 80 is shown. The pocketed surface 92 includes a plurality of circumferentially distributed wedge pockets 100 separated from respective adjacent wedge pockets 100 by inwardly extending radial protrusions 102. Each radial protrusion 102 is circumferentially offset from the other radial protrusions 102, and each radial protrusion 102 extends towards the outer surface 86 of the inner hub 78. Further, each radial protrusion 102 includes a first wall 104 of a wedge pocket 100 and a second wall 106 of an adjacent wedge pocket 100. The roller elements 82 are biased away from the first wall 104 of each wedge pocket 100 by the resilient member 84, such as but not limited to, an energizing spring 108. The spring 108 in each wedge pocket 100 is biased to urge the roller element 82 in the direction of rotation of the outer hub 80 about the rotation axis R, and may further be configured to push the roller element 82 towards the second wall 106 of each respective wedge pocket 100. The roller elements 82, which are each rotatable about their own rotation axis as shown in FIG. 4, are configured to transfer torque between the inner and outer hubs 78, 80 when the roller elements 82 are wedged between the inner and outer hubs 78, 80. Each wedge pocket 100 further includes a third wall 110 extending between the first and second walls 104, 106. The first, second, and third walls 104, 106, and 110 are integrally connected to form the wedge pocket 100 and may include any number of angled surfaces therein. Further, one or more of the walls 104, 106, 110 may include curved surfaces. The third wall 110 at least substantially faces the inner hub 78 and serves as a contact surface, such as a flat ramp contact surface, for the roller elements 82.

As further shown in FIGS. 6-8, the third wall 110 forms a non-zero angle, hereinafter referred to as a wedge angle 112, with respect to a line 114 tangent to the outer surface 86 of the inner hub 78. The tangent line 114 is relative to an area of the outer surface 86 of the inner hub 78 between the first and second walls 104, 106 of the wedge pocket 100, and more particularly at a location that may be circumferentially equidistant between the first and second walls 104, 106. As illustrated, the wedge angle 112 is acute in the direction of rotation 122 of the outer hub 80. The wedge pocket 100 has a radial depth, measured from the third wall 110 and compared to an innermost surface 116 of the outer hub 80 (such as the end wall of the radial protrusion 102). The radial depth of the wedge pocket 100 at a first side 118 adjacent the first wall 104 is greater than the radial depth at a second side 120 adjacent the second wall 106. The radial depth of the wedge pocket 100 increases from the second side 120 to the first side 118.

Figure 8:
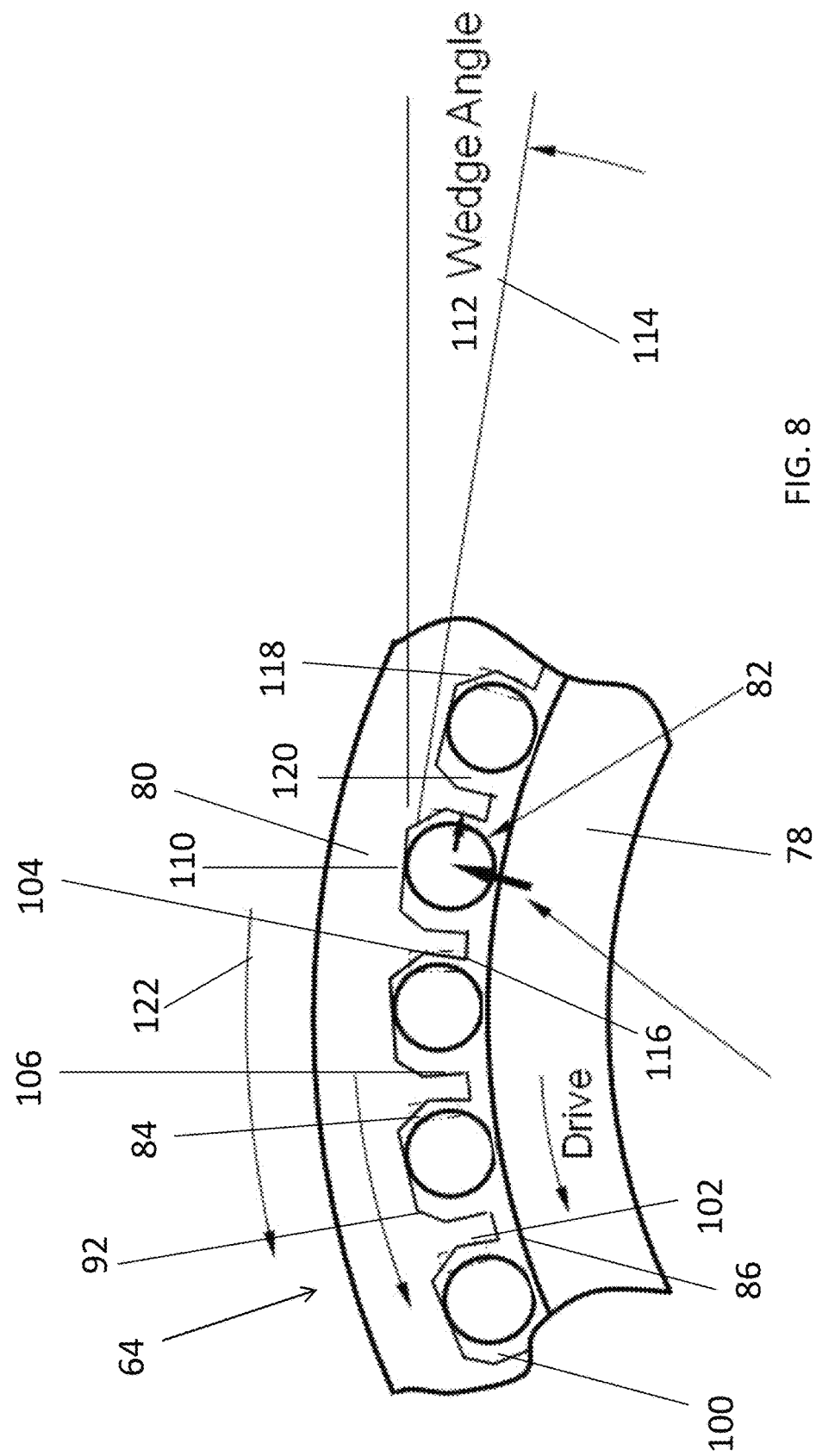

The overrunning clutch 64 operates in two modes: a drive mode as shown in FIG. 6 and an overrunning mode shown in FIGS. 7 and 8. In certain situations, as will be further described below, the overrunning clutch 64 may operate momentarily in the overrunning mode, as shown in FIG. 7, or may operate in a sustained overrunning mode as shown in FIG. 8. With reference to FIG. 6, the drive mode or "torque transfer mode" will first be described. The drive mode of the overrunning clutch 64 is entered when the energizing spring 108 initiates contact of the roller elements 82 with the wedge created between the inner and outer hubs 78, 80, and thus the overrunning clutch 64 is in an engaged condition. This occurs when the inner hub 78, which serves as a "drive" hub, rotates faster or into the outer hub 80 (the "driven" hub), such that the energizing spring 108 pushes the roller element 82 in the direction of the inner hub rotation. The wedge angle 112 of the wedge pocket 100 assures contact of the roller element 82 with both the inner and outer hubs 78, 80, and thus the rotation action pinches the roller elements 82 between the inner and outer hubs 78, 80 creating a mechanical interference and enabling torque to be transmitted from the inner hub 78 to the outer hub 80. Rotation of the inner hub 78 will push the roller elements 82 towards the second wall 106, and towards the shallow end of the wedge pocket 100 (the side 120 of the wedge pocket 100 having a smaller radial depth). The third wall 110 thus wedges the roller elements 82 against the inner hub 78 to transfer the torque during the drive mode, where each roller element 82 is trapped between the second wall 106 of each respective wedge pocket 100 and the spring 108 within the wedge pocket 100, and between the third wall 110 of the outer hub 80 and the outer surface 86 of the inner hub 78. In this trapped condition of the roller element 82, the inner hub 78 is fixed rotationally with respect to the outer hub 80 and the rotational speed of the outer hub 80 matches the rotational speed of the inner hub 78. The roller elements 82, which are each rotatable about their own rotation axis (see FIG. 4), transfer torque between the inner and outer hubs 78, 80 when the roller elements 82 are wedged between the inner and outer hubs 78, 80, and thus torque from the electric motor 24 is transferred to the rotor system 12 or 18. Thus, torque is transmitted from the motor 24, and more particularly the motor-rotor 54, to the rotor blades 20, via yoke assembly 32, in the drive mode. In this mode, the motor 24 and the rotor system 12 or 18 are rotationally coupled.

With reference to FIG. 7, in certain maneuvering flight situations, where the rotational speed of the main rotor system 12 (and rotational speed of the outer hub 80) momentarily exceeds the rotational speed of the motor-rotor 54 (and rotational speed of the inner hub 78), the wedge angle 112 permits the outer hub 80 to slip past the roller elements 82, or overrun. While in this mode, the roller elements 82, which are still rotatable about their own roller rotation axes, may remain in contact with both inner and outer hubs 78, 80. The energizing spring force of the springs 108 is sufficient to react to the tangential component of the centrifugal force of the roller elements 82 when such a condition occurs. Such momentary overrunning may occur for less than about two seconds, and even less than about one second, such as in flight maneuvers that increase up flow, for example, as in a deceleration maneuver where the pilot pitches the rotor aft to slow the helicopter. Pilots may use various techniques to manage the rotors energy state and, pending the maneuver/condition, can sustain autorotation for longer periods. Certain rotary-wing aircraft, such as low disc loading helicopters (3-4 lbs./ft$^2$) may be more susceptible to overrunning than other rotary-wing aircraft, such as high disc loading helicopters (8-10 lbs./ft$^2$). In this mode, the motor-rotor 54 is rotationally decoupled from the rotor system 12. However, as the rotational speed of the main rotor system 12 decays, the overrunning clutch 64 reengages and re-enters the drive mode as described with reference to FIG. 6.

In the sustained overrunning condition illustrated in FIG. 8, such as in an engine-out condition, the overrunning clutch 64 allows the rotor blades 20 to continue spinning or auto-rotate about rotation axis R, as the rotor system 12 or 18 is rotationally decoupled from the motor-rotor 54. Additional centrifugal force acting on the roller elements 82 compresses the energizing springs 108, allowing the roller element 82 to reposition within their respective wedge pockets 100 closer to the first wall 104 allowing separation between the inner hub 78 and the roller elements 82 as the roller elements 82 enter an area of the wedge pockets 100 having the greater radial depth. With the roller elements 82 not frictionally engaged with the inner hub 78, the outer hub 80 is able to have a rotational speed that exceeds that of the inner hub 78. The outer hub 80 will remain rotational free unless the inner hub 78 once again matches the rotational speed of the outer hub 80, at which point the clutch 64 would return to the drive mode.

Embodiments of the propulsion system 22 including at least one electric motor 24 contained within the surrounding fairing 42 may be implemented to one or both of the main rotor system 12 and the tail rotor system 18 or other auxiliary propulsion system. Benefits of the propulsion system 22 include but are not limited to a reduction in weight, fewer parts and lower costs relative to more traditional aircrafts. Moreover, while traditional gearboxes are eliminated, the overrunning clutch 64 described herein for the propulsion system 22 can transmit high torque and at relatively low speeds, such as hundreds of RPM, as opposed to thousands of RPM in traditional designs. Further, as the direct drive propulsion system 22 eliminates the need for a traditional gearbox, it also removes a convenient oil supply for lubrication purposes. The roller ramp design of the overruning clutch 64 is ideally suited to meet the requirements of the direct drive propulsion system 22. The clutch 64 is capable of transmitting high torsional loads as a result of larger hub diameters (greater moment arm) allowing more roller elements 82 (lower loads per roller) to be installed. Additionally, the wedge geometry of the wedge pockets 100 in the pocketed surface 92 of the outer hub 80 allows the roller elements 82 to displace radially outward, away from the outer surface 86 of the inner hub 78, eliminating contact and reducing friction, wear and heat. Further, as the outer hub 80 is built into the motor support housing 70, the motor support housing 70 is advantageously dual-purposed by providing both support to the motor 24 and serving as a portion of the clutch 64.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. It should be further noted that the terms "first," "second," and the like herein do not denote any order, quantity, or importance, but rather are used to distinguish one element from another. The present disclosure is thus not limited to the particular examples disclosed herein, but includes all embodiments falling within the scope of the appended claims.

What is claimed is:

1. An electric propulsion system for use with a mast defining an axis of rotation and one or more rotor blades which rotate about the axis of rotation, the propulsion system comprising:
    a yoke assembly rotatable with respect to the mast and about the axis of rotation, the yoke assembly configured to support one or more of the rotor blades therefrom;
    an electric motor including a motor-stator and a motor-rotor, the electric motor arranged circumferentially around the mast;
    a motor support housing circumferentially surrounding the mast and including a rotatable portion attached to the yoke assembly and rotatable with the yoke assembly; and
    an overrunning clutch including an inner hub and an outer hub, the inner hub rotatable with the motor-rotor, and the outer hub rotatable with the rotatable portion of the motor support housing;
    wherein the overrunning clutch is configured to transfer torque from the electric motor to the yoke assembly in a drive mode of the electric propulsion system, and the overrunning clutch is configured to disengage the yoke assembly from the electric motor in an overrunning mode of the electric propulsion system.

2. The electric propulsion system of claim 1, wherein an outer hub rotational speed of the outer hub is the same as an inner hub rotational speed of the inner hub during the drive mode, and the outer hub is rotationally free from the inner hub such that the outer hub rotational speed is different from the inner hub rotational speed during the overrunning mode.

3. The electric propulsion system of claim 1, further comprising a plurality of roller elements trapped between the outer hub and the inner hub, the roller elements in contact with the inner hub in the drive mode.

4. The electric propulsion system of claim 3, wherein the overrunning mode includes a first overrunning mode that temporarily disengages the yoke assembly from the electric motor, and a second overrunning mode that disengages the yoke assembly from the electric motor for a longer time period than the first overrunning mode.

5. The electric propulsion system of claim 4, wherein the plurality of roller elements maintain contact with the inner and outer hubs in the first overrunning mode, and torque is not transferred from the inner hub to the outer hub in the first overrunning mode.

6. The electric propulsion system of claim 5, wherein the first overrunning mode lasts for a time period of approximately two seconds or less.

7. The electric propulsion system of claim 4, wherein the plurality of roller elements are not in contact with the inner hub in the second overrunning mode.

8. The electric propulsion system of claim 7, wherein the one or more rotor blades auto-rotate about the axis of rotation in the second overrunning mode.

9. The electric propulsion system of claim 3, wherein the outer hub includes a plurality of wedge pockets respectively supporting the plurality of roller elements therein, each wedge pocket including a wall that forms an acute wedge angle with a line tangent to the inner hub between first and second sides of each wedge pocket.

10. The electric propulsion system of claim 9, wherein, in the overrunning mode, centrifugal force pushes the roller elements towards the first sides of the wedge pockets, and in the drive mode, rotation of the inner hub in a drive direction and a resilient member in each wedge pocket pushes the roller elements to the second sides of the wedge pockets.

11. The electric propulsion system of claim 1, wherein the outer hub is integrally combined with and rotatable with the rotatable portion of the motor support housing.

12. The electric propulsion system of claim 1, further comprising a plurality of roller elements trapped between the inner and outer hubs, wherein the inner hub includes an inner hub race, and the outer hub includes a plurality of wedge pockets respectively supporting the plurality of roller elements therein.

13. The electric propulsion system of claim 12, wherein each wedge pocket includes a first side and a second side, each roller element biased towards the second side by a resilient member.

14. The electric propulsion system of claim 13, wherein each wedge pocket includes both a first radial depth at the first side and a second radial depth at the second side, the second radial depth less than the first radial depth, the roller element in each wedge pocket disposed at the second side during the drive mode and moved towards the first side during the overrunning mode.

15. The electric propulsion system of claim 1, further comprising an inner hub support member arranged to support the motor-rotor thereon, the inner hub support member connected to the inner hub, and one or more inner hub guides disposed between the inner hub support member and the yoke assembly.

16. A rotary-wing aircraft comprising:
    an airframe;
    a mast engaged to the airframe and defining an axis of rotation, the mast stationary with respect to the airframe;
    a plurality of rotor blades;

a yoke assembly rotatable with respect to the mast and about the axis of rotation, the yoke assembly configured to support one or more rotor blades projecting radially outward from the yoke assembly;

an electric motor including a motor-stator and a motor-rotor, the electric motor arranged circumferentially around the mast, the electric motor disposed exteriorly of the airframe;

a motor support housing circumferentially surrounding the mast and including a rotatable portion rotatable with the yoke assembly; and, an overrunning clutch including an inner hub and an outer hub, the inner hub rotatable with the motor-rotor, and the outer hub rotatable with the rotatable portion of the motor support housing;

wherein the overrunning clutch is configured to transfer torque from the electric motor to the yoke assembly in a drive mode of the electric propulsion system, and the overrunning clutch is configured to disengage the yoke assembly from the electric motor in an overrunning mode of the electric propulsion system when rotational speed of the yoke assembly exceeds rotational speed of the motor-rotor.

17. The rotary-wing aircraft according to claim 16, wherein the rotor blades form one of a main rotor system and a tail rotor system of the rotary-wing aircraft.

18. The rotary-wing aircraft according to claim 16, wherein the overrunning clutch is disposed radially between the electric motor and the mast.

19. The rotary-wing aircraft according to claim 16, wherein the electric motor is a first motor, the overrunning clutch is a first overrunning clutch, the electric propulsion system further includes a second motor and a second overrunning clutch, and the first motor and the first overrunning clutch are longitudinally separated from the second motor and the second overrunning clutch with respect to the mast by the yoke assembly.

20. The rotary-wing aircraft according to claim 19, wherein the second motor is arranged closer to the airframe than the first motor.

* * * * *